April 22, 1924.   G. KENDRICK   1,491,046
BEARING
Filed Oct. 3, 1923
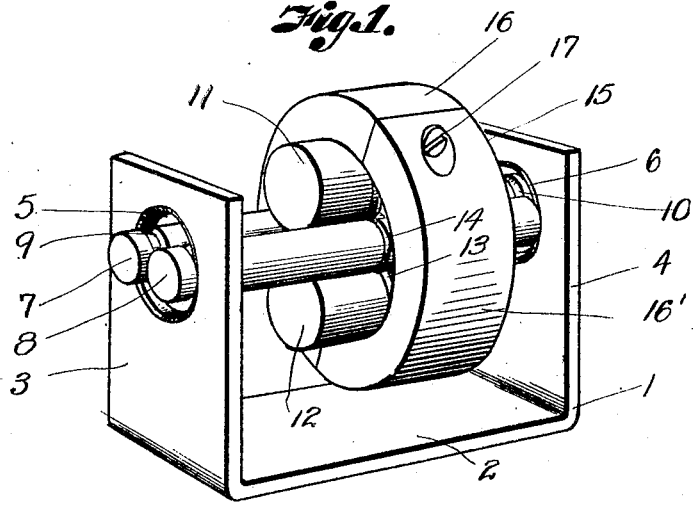
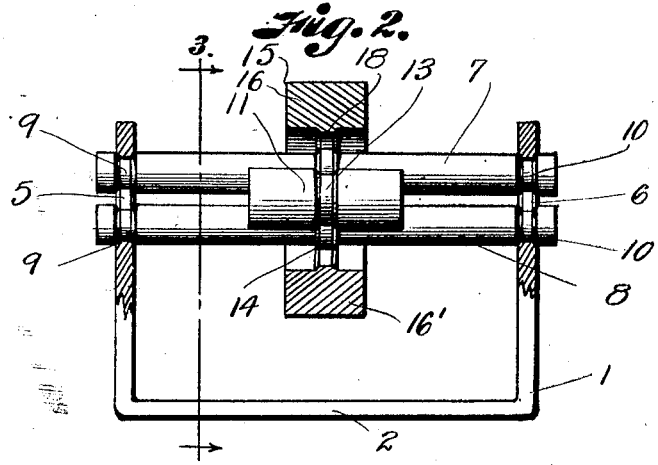
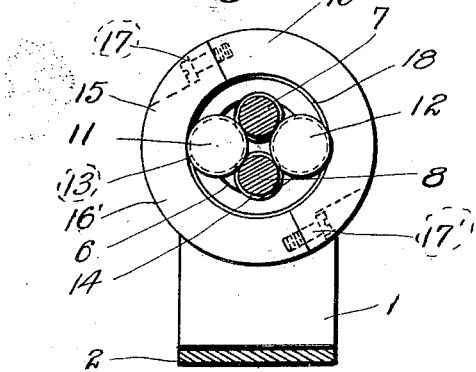
INVENTOR
Glenn Kendrick
BY
ATTORNEY Patented Apr. 22, 1924.

1,491,046

UNITED STATES PATENT OFFICE.

GLENN KENDRICK, OF CAMERON, MISSOURI.

BEARING.

Application filed October 3, 1923. Serial No. 666,328.

*To all whom it may concern:*

Be it known that I, GLENN KENDRICK, a citizen of the United States, residing at Cameron, in the county of Clinton and State of Missouri, have invented certain new and useful Improvements in Bearings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to bearings and particularly to roller bearings, the primary object being to provide a novel form of bearing which will possess the minimum friction and the bearing is especially designed for a ring-shaped member such as a pulley or the like. The novel construction of the invention will be clearly understood by reference to the following description in connection with the accompanying drawings in which:

Fig. 1 is a perspective view of a bearing constructed in accordance with my invention.

Fig. 2 is a sectional view through the support and the pulley carried by the bearing members.

Fig. 3 is a sectional view on line 3—3 of Fig. 2.

Fig. 4 is a perspective view of one of the bearing rollers.

Referring to the drawings now by numerals of reference:

1 designates a bracket which is shown as substantially U-shaped consisting of a web 2 and the two upstanding arms 3 and 4, the arms 3 and 4 being provided with circumferential openings 5 and 6 in which are spaced journals 7 and 8. The journals are shown as comprising rollers having constricted portions or grooves 9 and 10 at their respective ends, the grooves receiving the edges of the circumferential openings 5 and 6 so that the rollers 7 and 8 will be held against inthrust. The rollers or journals 7 and 8 are in spaced relation and they are held in such position by the short rollers 11 and 12, the diameters of which are greater than the diameters of the journals 7 and 8. The rollers 11 and 12 have constricted portions 13 to receive the bevelled collars 14 on the journals 7 and 8 so that the rollers 11 and 12 will be held against longitudinal movement with respect to the journals 7 and 8 although the rollers 11 and 12 may turn on the journals 7 and 8 as will be clearly seen by reference to the drawings.

About the rollers 11 and 12 and about the journals 7 and 8 is a confining ring or pulley 15 which may consist of the two members 16 and 16' fastened together by the fastening devices 17 and 17'. The two halves 16 and 16' fit around the rollers, as the rollers 11 and 12 and the journals 7 and 8 are assembled. I prefer to construct the ring or pulley with a circumferential rib 18 which may be received in the bevelled grooves 13 of the rollers 11 and 12 so that the ring will be held against longitudinal movement or end thrust. It will therefore be seen that all the rotating members will be held against end thrust while being permitted to rotate freely one upon the other. The diameter of the ring is such that the rollers 11 and 12 will force the journals 7 and 8 apart slightly, so there will be no contact between 7 and 8, the contact being through the journals and the rollers, for example 7 will contact with 11 which will also contact with journal 8 on one side and roller 12 will contact with 7 and 8 on the other but the two rollers 11 and 12 will not contact one with the other. The ring is carried by the rollers 11 and 12 but is not in contact with the journals 7 and 8. I have shown the journals and the rollers as arranged in bearings but I do not wish to be limited to this exact arrangement.

The essential feature of the invention is the arrangement of journals rotatable in bearings and in spaced relation, rollers carried by the journals and a ring carried by the rollers. If a belt is applied to the pulley it is obvious that rotary motion will be communicated to the rollers 11 and 12 and to the journals 7 and 8, the journals having their bearing on the edges of the circumferential openings 5 and 6 with a minimum of friction.

It will also be apparent that all of the members of the bearing including the ring, are so interlocked that while the members may have free rotating movement they are held against endwise movement due to end thrusts.

Since the contacting edges of the various rotary elements are bevelled there will be no sliding friction encountered, but instead there will only be a rolling contact.

What I claim and desire to secure by Letters-Patent is:

1. In a device of the class described, supporting members having circumferential openings, journals the perimeters of which bear against the edges of the circumferential openings; rollers bearing against the journals and maintaining them in spaced relation and a ring carried by the rollers.

2. In combination a support member having aligning circumferential openings, parallel spaced journals in the openings, rollers bearing against the journals and a ring carried by the rollers.

3. In combination a support member having aligning circumferential openings, parallel spaced journals in the openings, rollers bearing against the journals, a ring carried by the rollers and means for inter-locking the journals, the rollers and the ring to prevent end-wise movement of one with respect to the other.

4. In combination a bearing comprising spaced free movable journals, rollers bearing at opposite points on the journals, the rollers being of greater diameter than the diameters of the journals and a ring carried by the rollers.

5. In a device of the class described a plurality of journals, a plurality of rollers carried thereby, the rollers being of greater diameter than the diameter of the journals and a ring carried by the rollers.

In testimony whereof I affix my signature.

GLENN KENDRICK.